US010505909B2

(12) United States Patent
Rajapaksa

(10) Patent No.: US 10,505,909 B2
(45) Date of Patent: Dec. 10, 2019

(54) DUAL PHYSICAL CHANNEL SECURE CONNECTION

(71) Applicant: Intel Corporation, Santa Clara, CA (US)

(72) Inventor: Indrajith Rajapaksa, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 15/387,111

(22) Filed: Dec. 21, 2016

(65) Prior Publication Data

US 2018/0176198 A1 Jun. 21, 2018

(51) Int. Cl.
*H04L 29/06* (2006.01)
*H04B 10/85* (2013.01)
(Continued)

(52) U.S. Cl.
CPC .......... *H04L 63/061* (2013.01); *H04B 10/114* (2013.01); *H04B 10/85* (2013.01); *H04L 63/0442* (2013.01); *H04L 67/12* (2013.01)

(58) Field of Classification Search
CPC ... H04L 63/061; H04L 63/0442; H04L 67/12; H04L 9/32; H04L 29/06; H04L 29/08; G06F 15/16; H04B 10/114; H04B 10/85
(Continued)

(56) References Cited

U.S. PATENT DOCUMENTS 6,317,831 B1* 11/2001 King .................. H04L 63/0428
713/171
8,126,157 B2* 2/2012 Buil ....................... G06F 21/10
380/270
(Continued)

FOREIGN PATENT DOCUMENTS

CN 103067055 4/2013
CN 103997570 8/2014
(Continued)

OTHER PUBLICATIONS

"U.S. Appl. No. 15/086,910, Appeal Brief filed Jan. 18, 2018", 13 pgs.
(Continued)

*Primary Examiner* — Venkat Perungavoor
*Assistant Examiner* — Khalid M Almaghayreh
(74) *Attorney, Agent, or Firm* — Schwegman Lundberg & Woessner, P.A.

(57) ABSTRACT

Various systems and methods for initiating a communication session are provided herein. A system for initiating a communication session includes a transmitter disposed in a housing of the system; a controller coupled to the transmitter, and disposed in the housing; a communication controller to interface with the controller and cause the transmitter to transmit a first signal to a receiver device, the first signal including a public key associated with the system; and a radio coupled to the communication controller to receive a response from the receiver device, the response including an
(Continued)

encrypted public key of the receiver device and a unique identifier that identifies the receiver device, the public key of the receiver device and the unique identifier both encrypted with the public key associated with the system, and the response used to establish a wireless connection between the system and the receiver device.

24 Claims, 7 Drawing Sheets

(51) Int. Cl.
*H04L 29/08* (2006.01)
*H04B 10/114* (2013.01)

(58) Field of Classification Search
USPC .................. 713/171; 709/214, 223, 230–232; 726/18, 28; 455/41.2
See application file for complete search history.

(56) References Cited

U.S. PATENT DOCUMENTS

| | | | |
|---|---|---|---|
| 8,249,504 B2 | 8/2012 | Fujii | |
| 8,254,838 B2 | 8/2012 | Feldstein | |
| 8,798,671 B2* | 8/2014 | Grubb | H04W 8/245 |
| | | | 370/338 |
| 9,655,150 B2* | 5/2017 | Sakai | H04W 8/005 |
| 10,097,948 B2 | 10/2018 | Rajapaksa et al. | |
| 2004/0165726 A1 | 8/2004 | Yamamichi et al. | |
| 2006/0135065 A1 | 6/2006 | Lee et al. | |
| 2007/0032195 A1 | 2/2007 | Kurisko et al. | |
| 2007/0171848 A1* | 7/2007 | Fujii | H04L 63/061 |
| | | | 370/310 |
| 2009/0006846 A1 | 1/2009 | Rosenblatt | |
| 2010/0021176 A1 | 1/2010 | Holcombe et al. | |
| 2011/0021151 A1* | 1/2011 | Takekawa | H04M 1/7253 |
| | | | 455/41.2 |
| 2011/0070837 A1* | 3/2011 | Griffin | H04B 5/0062 |
| | | | 455/41.3 |
| 2011/0237193 A1* | 9/2011 | Shen | G06F 1/1694 |
| | | | 455/41.2 |
| 2013/0171981 A1 | 7/2013 | Koo woo | |
| 2013/0332739 A1 | 12/2013 | Yi et al. | |
| 2014/0273844 A1* | 9/2014 | Castillo | H04B 7/2612 |
| | | | 455/41.2 |
| 2015/0078753 A1* | 3/2015 | Lung | G08C 23/04 |
| | | | 398/106 |
| 2015/0121470 A1 | 4/2015 | Rongo et al. | |
| 2015/0264724 A1* | 9/2015 | Yao | H04W 76/02 |
| | | | 705/39 |
| 2016/0134642 A1* | 5/2016 | Hamid | H04L 63/045 |
| | | | 713/160 |
| 2017/0006004 A1 | 1/2017 | Li et al. | |
| 2017/0142073 A1* | 5/2017 | Fransen | H04W 4/70 |
| 2019/0116619 A1* | 4/2019 | Hauck | H04W 76/10 |

FOREIGN PATENT DOCUMENTS

| | | |
|---|---|---|
| CN | 104735607 | 6/2015 |
| EP | 2835002 | 2/2015 |
| KR | 101076533 | 10/2011 |
| WO | 2015199777 | 12/2015 |

OTHER PUBLICATIONS

"International Application Serial No. PCT US2017 062790, International Search Report dated Mar. 19, 2018", 3 pgs.

"International Application Serial No. PCT US2017 062790, Written Opinion dated Mar. 19, 2018", 9 pgs.

"Keysight U1177A IR-to-Bluetooth Adapter", Data Sheet, Keysight Technologies, (Aug. 3, 2014), 6 gs.

"I want to know more about IR Blaster", Samsung, [Online]. Retrieved from the Internet: URL: http://www.samsung.com/au/support/skp/faq/1039616, (Updated: Jul. 14, 2015).

"U.S. Appl. No. 15/086,910, Non Final Office Action dated Dec. 12, 2016", 16 pgs.

"U.S. Appl. No. 15/086,910, Response filed Apr. 12, 2017 to Non Final Office Action dated Dec. 12, 2016", 11 pgs.

"U.S. Appl. No. 15/086,910, Final Office Action dated May 18, 2017", 16 pgs.

"International Application Serial No. PCT/US2017/018562, International Search Report dated May 24, 2017", 3 pgs.

"International Application Serial No. PCT/US2017/018562, Written Opinion dated May 24, 2017", 7 pgs.

"U.S. Appl. No. 15/086,910, Pre-Appeal Brief Request filed Jul. 18, 2017", 5 pgs.

"International Application Serial No. PCT/US2017/018562, International Preliminary Report on Patentability dated Oct. 11, 2018", 9 pgs.

* cited by examiner

DUAL PHYSICAL CHANNEL SECURE CONNECTION

TECHNICAL FIELD

Embodiments described herein generally relate to networking and in particular, to initiating a communication session.

BACKGROUND

According to some technical analysts, there will be over 50 billion connected "things" by the year 2020. This will completely transform current infrastructures and will drive new innovations in industry, products, and services. Internet of Things (IoT) is term that represents devices and systems that communicate over a network, such as the Internet. The IoT is a network of physical objects or "things" embedded with electronics, software, and sensors that enables these objects to collect and exchange data between themselves and between other computing devices. Example "things" include connected home appliances, sensors in automobiles, biochips, public cameras, wearable devices, and the like. Standards groups have begun the process of formulating standards that specify procedures for device discovery, communications between devices, service discovery, security, and other procedures used in forming and maintaining IoT networks. Example groups include the Open interconnect Consortium (OIC), Internet Protocol for Smart Objects (IPSO) Alliance, and the Industrial Internet Consortium.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
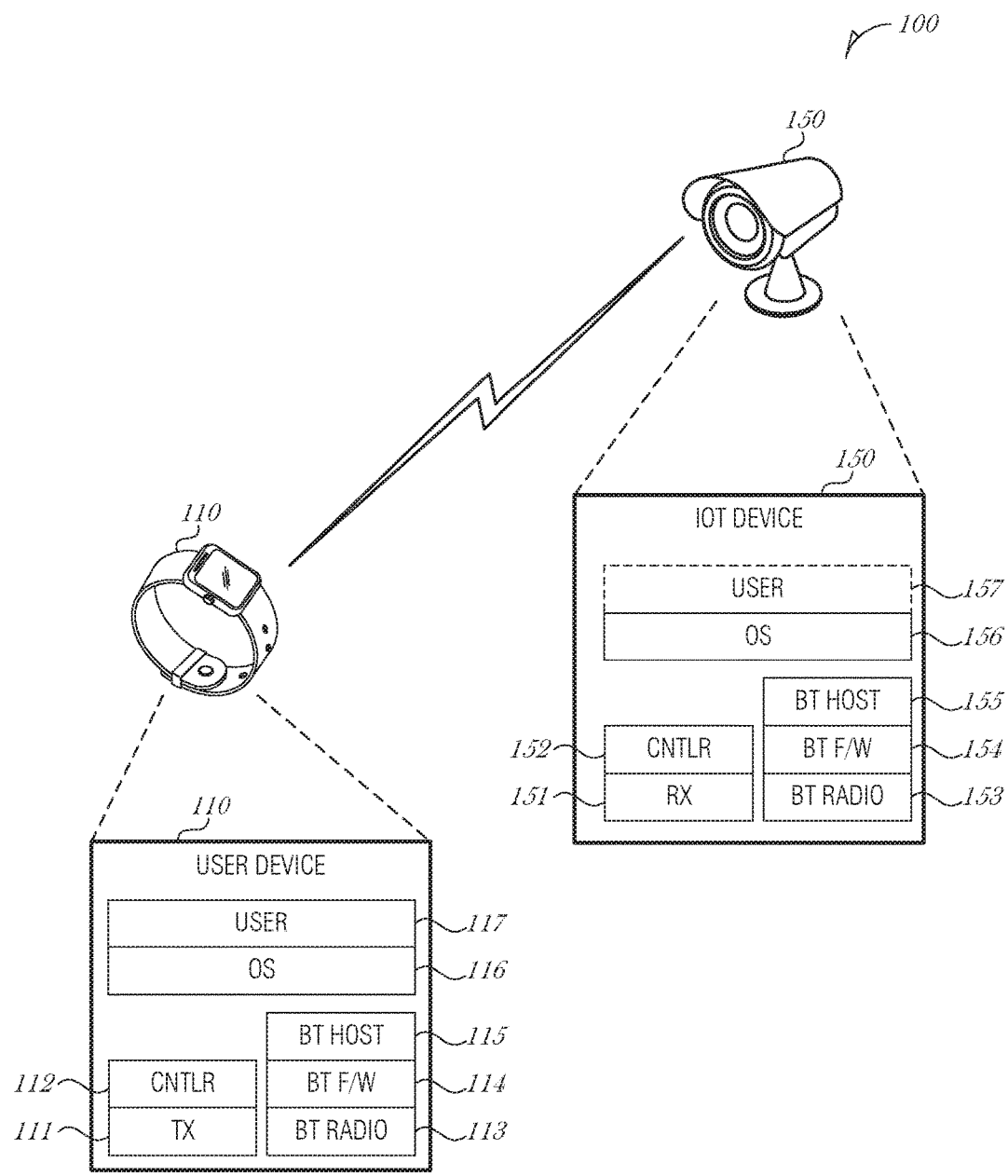
FIG. 1 is a schematic diagram illustrating an operating environment, according to an embodiment.

In the following description, for purposes of explanation, numerous specific details are set forth in order to provide a thorough understanding of sonic example embodiments. It will be evident, however, to one skilled in the art that the present disclosure may be practiced without these specific details.

IoT may be described as a 'network of networks' where devices utilize underlying communications networks and technologies such as the Internet to communicate, but form their own logical networks of IoT devices (called nodes). As noted above, the prevalence of IoT devices is increasing. IoT devices may contain a variety of sensors (e.g., cameras, microphones, global positioning systems (GPS), telemetry, etc.) for a variety of purposes, such as a camera and microphone on a television set to allow video conferencing. IoT devices include practically anything that is network-addressable and remotely-controllable, such as window shades, refrigerators, ceiling lights, landscaping lights, security systems, thermostats, televisions, network accessible storage (NAS), automobiles, health monitors, exercise equipment, industrial equipment, manufacturing equipment, robots, and the list goes on.

Interconnection between IoT devices may be provided using a variety of communication standards, such as ZIGBEE (i.e., conforms to families of standards defined in IEEE 802.15.4), BLUETOOTH (i.e., conforms to families of standards defined in IEEE 802.15.1 and defined by the Bluetooth Special Interest Group (SIG)), BLUETOOTH Low Energy (BLE), Symphony, 6LoWPAN, Wireless Fidelity (WiFi) protocols utilizing an Institute for Electrical and Electronics Engineers (IEEE) 802.11 family of standards, including 802.11n, 802.11 ac, 802.11 ad, 802.11 ah, and the like. In the case of BLUETOOTH and BLE, two devices are paired using a connection protocol. Conventional BLUETOOTH pairing requires user involvement with software and knowledge of the BLUETOOTH ID of the pairing device to initiate the connection. The BLUETOOTH ID, which has to be transmitted to pair BLUETOOTH devices, poses a security risk. What is needed is a more efficient, intuitive, and secure connection and pairing system and protocol.

Disclosed herein are systems and methods that provide a simplified method to pair and connect BLUETOOTH devices. Using an infrared (IR) light, or any other directional beam signal, a user may initiate a BLUETOOTH pairing or connection protocol from a user device to bond with a target device. Use of an infrared or other directional signal as a point-and-connect protocol has several potential benefits, including ease of use, security, power savings, consistent implementation, directionality, low cost, and faster pairing and bonding time. For example, the user does not have to learn different IoT interfaces to search for IoT devices; instead, the user merely points to and activates the IoT device of his choice. Pairing security is enhanced due to the proximity, line-of-sight, and other characteristics of directional signal-based initiation. A user may avoid or detect a potential man-in-the-middle attack, for example, because the user is able to see the intended IoT device. Further, because the user device does not have to constantly advertise its existence, the battery drain is reduced and computational energy is conserved and secure. Other advantages will become apparent in view of the continuing discussion.

BLUETOOTH connection techniques differ slightly between classic BLUETOOTH and BLE. In classic BLUETOOTH, the procedure for forming connections is asymmetrical, where one BLUETOOTH device acts as a pager while the other BLUETOOTH device scans for pages. The procedure is targeted so that the page is only responded to by the specified BLUETOOTH device scanning for pages.

In BLE, a device that transmits advertising packets is referred to as an advertiser and a device that receives advertising packets on the advertising channels with intent to connect to an advertiser is known as an initiator. When an initiator receives an advertising packet of interest, then the initiator may request a connection over the same advertising radio frequency (RF) channel on which it received the connectable advertising packet. Devices that receive advertising on the advertising channel without the intention of connecting are referred to as scanners and are outside of the scope of this discussion. An initiator may make a request to connect to the advertiser, and once the connection is established, the initiator is referred to as the master, while the advertiser is referred to as the slave. The master controls aspects of the master-slave communication.

It is understood that while examples and embodiments are described using the BLE nomenclature, the systems and methods described herein may also be applied to BLUETOOTH.

FIG. 1 is a schematic diagram illustrating an operating environment 100, according to an embodiment. The operating environment 100 includes a user device 110 and an IoT device 150. The user device 110 may be any type of compute device including, but not limited to a smartphone, a laptop, a hybrid computer, a tablet, a phablet, a smartwatch, or other similar suitable devices that allow a user to initiate connection with the IoT device 150. The IoT device 150 includes, but is not limited to any type of device capable of performing a compute function and connecting over a BLUETOOTH or BLE connection. Examples include consumer goods (e.g., television, refrigerator, washing machine, computer printer, audio system, smartphone, fire alarm, baby monitor, home automation devices, etc.), manufacturing devices, retail devices (e.g., shopping carts, price scanners, inventory systems, etc.), public works (e.g., gas meters, fire hydrants, street lights, etc.), and other suitable devices.

The user device 110 includes a transmitter 111, capable of sending data, and controlled by controller 112. In particular, the user device 110 may emit an IR signal from the transmitter 111 (e.g., IR emitter), the signal including information to initiate a BLUETOOTH connection with the IoT device 150. Alternatively, the transmitter 111 may emit a millimeter wave signal to initiate a BLUETOOTH connection. Other directional signals may be used in place of IR or millimeter wave, such as directional sound, or other wavelengths of visual light or ultraviolet light. The directional signaling may be performed using any wavelength from the radio wave spectrum down to and including the x-ray region.

The IoT device 150 includes a receiver 151 and controller 152, and upon receiving a triggering signal from the user device 110, the IoT device 150 may connect with the user device 110 over BLUETOOTH according to the IEEE 802.15 family of standards.

Both the user device 110 and IoT device 150 also include BLUETOOTH hardware, firmware, and software to enable BLUETOOTH connectivity. The user device 110 includes a BLUETOOTH radio 113 controlled by BLUETOOTH firmware 114 and BLUETOOTH host 115. Similarly, the IoT device 150 includes a BLUETOOTH radio 153 controlled by BLUETOOTH firmware 154 and BLUETOOTH host 155. Operating systems 116 and 156 interface with the respective controllers 112 and 152, and BLUETOOTH hosts 115 and 155. Examples of the operating systems 116 and 156 include desktop operating systems, embedded operating systems, real-time operating systems, proprietary operating systems, network operating systems, and the like. Examples include, but are not limited to Windows® NT (and its variants), Windows® Mobile, Windows® Embedded, UNIX, Android™, JavaOS, Symbian OS, Linux, and other suitable operating system platforms.

A communication controller (not shown) may be implemented in hardware, firmware, or in the operating system 116, 156 of the respective devices. The communication controller may act as an interface with various hardware abstraction layer (HAL) interfaces, such as device drivers, communication protocol stacks, libraries, and the like. The communication controller is operable to receive user input (e.g., from a system event or by an express system call to the communication controller), and interact with one or more lower-level communication devices (e.g., BLUETOOTH radio, cellular radio, infrared emitter, millimeter wave transceiver, etc.) based on the user input. The communication controller may be implemented, at least in part, in a user-level application that makes calls to one or more libraries, device interfaces, or the like, to cause communication devices to operate in a certain manner.

A user application space 117 and 157 on the user device 110 and optionally on the IoT device 150, are used to implement user-level applications, controls, user interfaces, and the like, for a user to control the respective device. An application, app, extension, control panel, or other user-level executable software program may be used to initiate the signal to then, in turn, initiate BLUETOOTH connection protocols. Application space 157 is optional on the IoT device Applications or other executables may be executed in operating system 156, protected memory, as an embedded process, or the like.

It is understood that other peer-to-peer protocols may be used instead of BLUETOOTH or BLE, such as WI-FI DIRECT or ZIGBEE. In such configurations, alternatively configured radios may he used along with the appropriate pairing or connection protocols.

Figure 2:
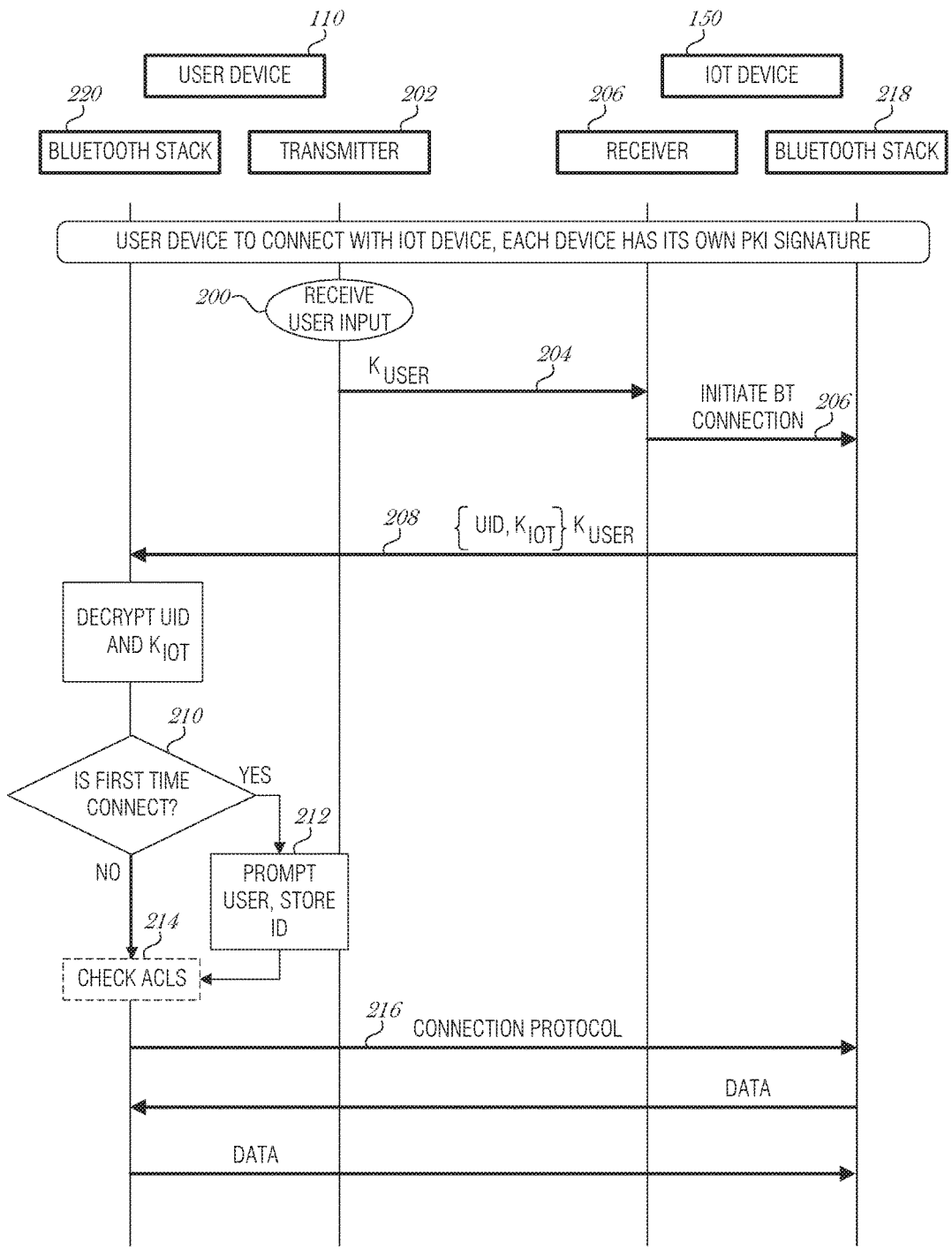
FIG. 2. is a swim lane diagram illustrating message traffic between the user device and the IoT device, according to an embodiment.

FIG. 2 is a swim lane diagram illustrating message traffic between the user device 110 and the IoT device 150, according to an embodiment. Prior to connection, each device is provisioned with a device-specific security key. The security key may be a digital signature provided by a certificate authority. The digital signature may include a public key and a private key, such as in a private-key infrastructure (PKI) mechanism. The PKI mechanism may be based on a Diffie-Hellman scheme, RSA algorithm, Lamport signatures, Merkle signatures, hash trees, Rabin signatures, or other suitable PKI schemes.

At 200, user input is received. The user input indicates that the user seeks to connect the user device 110 with the IoT device 150 using a BLUETOOTH (or BLE) connection. Various forms of user input may be received including, but not limited to a pressing a hard button, actuating a soft user interface control, performing a gesture, speaking a command, or other suitable user input.

Upon receiving the input, the user device 110 emits a signal using a transmitter 202 in the user device 110. The signal 204 includes the public key of the user device 110 ($K_{USER}$) and is transmitted by line-of-sight to the IoT device 150. The signal 204 may be one of several different types of directional signals including, but not limited to IR, millimeter wave, or directional sound. It is understood that transmitter 202 may be a transceiver in related embodiments.

The IoT device 150 receives the signal 204 at a receiver 206. In response to the signal 204, the IoT device 150 interfaces with a BLUETOOTH stack 218 to initiate a BLUETOOTH connection (operation 206). The IoT device 150 uses the BLUETOOTH stack 218 and associated firmware and radio to transmit an encrypted package to the user device 110. In particular, the IoT device 150 responds with a communication 208, which includes a unique identification (UID) associated with the IoT device 150. The UID may be a BLUETOOTH Device Identifier that is provisioned under the BLUETOOTH specification (e.g., 48-bit BLUETOOTH device address obtained from the IEEE Registration Authority). Alternatively, the UID may be an arbitrary UID, provided by another authority. The encrypted package also includes the security key of the IoT device 150 ($K_{IOT}$). Both the security key of the IoT device 150 and the UID associated with the IoT device 150 are encrypted with the security key of the user device 110 ($\{UID, K_{IOT}\} K_{USER}$). This responsive signal 208 acts as an advertisement, such as in the BLE protocol. The user device 110 may then act as an initiator, accepting the advertisement and initiating a connection.

The user device 110 now has the public key of the IoT device 150 and the unique identification (UID) associated with the IoT device 150. The user device 151 is able to decrypt the UID and determine whether it recognizes the UID. If this is the first time that the user device 110 has received this particular UID, then the user device 110 may prompt the user for verification (operation 210). For example, the user device 110 may display a prompt on a screen or other output presentation of the user device 110 and suspend until it receives user input indicating that the Ica device 150 is valid. After the user interacts with the user device 110 to indicate that the connection request was valid, the user device 110 may store the UID of the IoT device 115 in memory (e.g., in firmware or non-volatile storage on the user device 110, in a cloud storage location, or elsewhere) (operation 212). Optionally, at this time, the user device 151 may refer to one or more access control list mechanisms, such as a white list, a black list, or other controls (operation 214) to determine whether connection is allowed.

At operation 216, the user device 110 attempts to connect with BLUETOOTH (or BLE) to the IoT device 150 using the UID provided by the IoT device 150. In effect, the exchange up to this point has acted as an advertising mechanism for the IoT device 110 to announce its presence and with the signaling, to announce its ability and interest in connecting. In response, the user device 110 may store and forward the UID to a BLUETOOTH stack 220 of the user device 110, which will then begin the connection protocol. For example, in BLE, the BLUETOOTH stack 220 may issue a "create connection" command to create a link layer connection to a connectable advertiser (i.e., the IoT device 150). After connection is established, the user device 110 and IoT device 150 may exchange data and perform other conventional BLUETOOTH operations.

The IoT device 150 may optionally provide an indication of successful pairing or connection. The indication may be a visual, audible, or haptic signal. For example, the IoT device 150 may have a light-emitting diode (LED) that blinks green on successful pairing, yellow for a warning condition, and red for when the pairing or connection was unsuccessful. With audible chimes, a user may be alerted of various states, such as by using a light ding for successful pairing or connection, or a low gong for a failed pairing or connection. Haptic alerts may be used as well, such as with patterns of vibrations to indicate various states. Combinations of notification mechanisms may be used together.

If the user device 110 and IoT device 150 have never been bonded before, then the user device 110 and IoT device 150 may perform an initial pairing protocol. In an example, after causing the signal to be sent from the user device 110 to the IoT device 150, the user may have to interact with the user device 110 in order to initially pair the devices. After the initial pairing protocol is completed the first time, the devices maintain each other's information so that subsequent BLUETOOTH bonding may be performed without the user interaction step.

Figure 3:
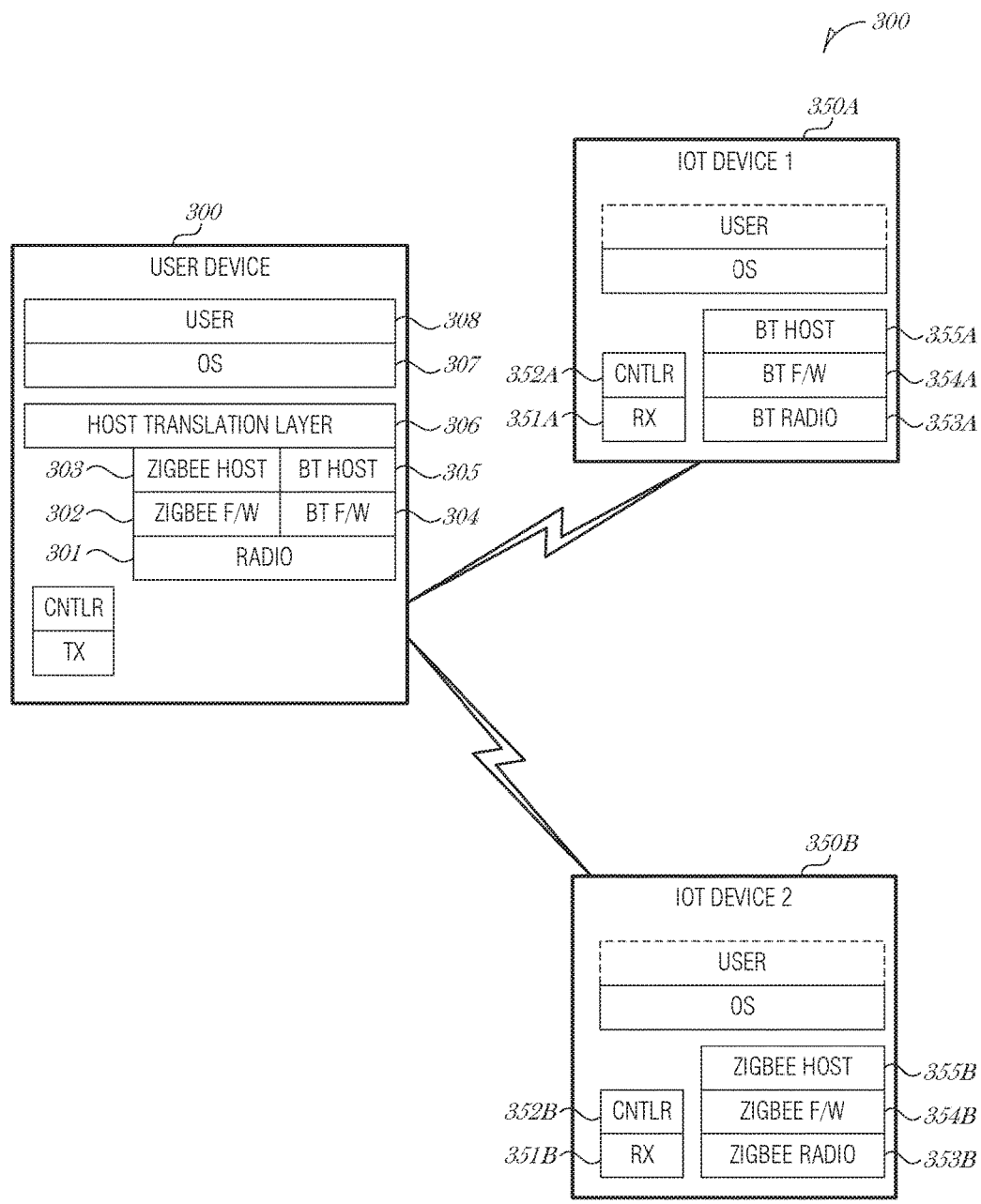
FIG. 3 is a block diagram illustrating a user device and two IoT devices, according to an embodiment.

FIG. 3 is a block diagram illustrating a user device 300 and two IoT devices 350A and 350B, according to an embodiment. The user device 300 includes components similar to that of user device 110 discussed in FIG. 1. The user device 300 of FIG. 3 includes a radio 301 that may be controlled for various types of communication standards, such as BLUETOOTH, BLE, ZIGBEE, Wi-Fi, WI-FI DIRECT, and the like. In the user device 300 illustrated in FIG. 3, the radio 301 is configured for use with Zig ZIGBEE Bee firmware 302 and an associated ZIGBEE host 303, and a BLUETOOTH firmware 304 and associated BLUETOOTH host 305. In order to provide a hardware abstraction layer, a host translation layer 306 is used. The host translation layer 306 provides an interface between the operating system 306 and the hosts (e.g., ZIGBEE host 303 and BLUETOOTH host 305). The host translation layer 306 may also be used to translate messaging from an application executing in user space 308. By abstracting the underlying hardware from the user-level applications, the host translation layer 306 provides a simplified user interface where the user is not aware of or needs to expressly control which protocol is used to connect to the respective IoT device 350A or 350B.

For example, when the user activates an agnostic control to connect to IoT device 350A, the user does not need to know which protocol is used to connect the user device 300 to the IoT device 350A or 350B. The user may activate a control, which may be a soft control (e.g., a button presented on a touchscreen) or a hard control (e.g., a button incorporated into the housing of the user device 300). The control may be agnostic in that the control may not be labeled or indicate how the user device 300 is to connect to the IoT device (e.g., IoT device 350A). For example, the agnostic control may be labeled "Connect" or "IoT Connect." In contrast, examples of a non-agnostic control is "Connect with BLUETOOTH" or "Connect using ZIGBEE." By using an agnostic control, the user is provided a simple mechanism to connect the IoT device that the user is pointing at with the user device. Upon detection of the activation of the agnostic control, the user device 300 may discover the IoT device 350A and initiate a connection using directional signals, as described above with respect to FIGS. 1-2. In particular, the IoT device 350A includes a receiver 351A and associated controller 352A to receive a directional signal from the user device 300, to initiate the connection. A BLUETOOTH connection may be created using the BLUETOOTH radio 353A, BLUETOOTH firmware 354A, and BLUETOOTH host 355A available on the IoT device 350A.

Similarly, if the user points the user device 300 at IoT device 350B, instead of connecting with a BLUETOOTH protocol, the user device 300 is able to instead connect with the IoT device 350B using the ZIGBEE protocol with the ZIGBEE firmware 302 and ZIGBEE host 303. The IoT device 350B includes complementary ZIGBEE hardware, firmware, and software to accept and control connections. In particular, the IoT device 350B includes a receiver 351B and associated controller 352B to receive a directional signal from the user device 300, to initiate the connection. The IoT device 350B also includes a ZIGBEE radio 353B, ZIGBEE firmware 354B, and ZIGBEE host 355B to communicate with the user device 300 using the ZIGBEE protocol.

Figure 4:
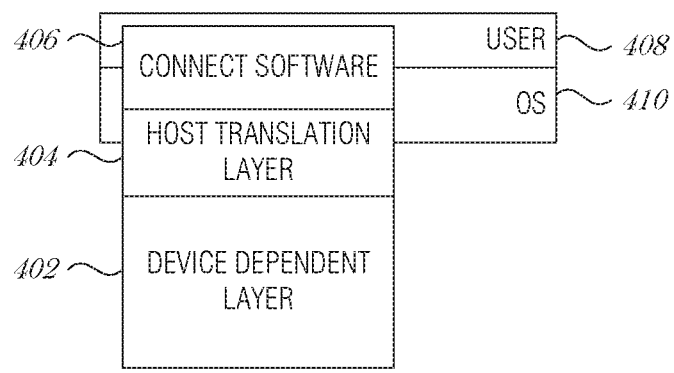
FIG. 4 is a block diagram illustrating the protocol stack of a flexible connection mechanism, according to an embodiment.

FIG. 4 is a block diagram illustrating the protocol stack 400 of a flexible connection mechanism according to an embodiment. The protocol stack 400 includes three layers: a device dependent layer 402, a host translation layer 404, and a connect software layer 406. The device dependent layer 402 includes various device driver firmware, hardware, and other components to implement connection mechanisms such as BLUETOOTH, ZIGBEE, Z-WAVE, WI-FI DIRECT, and other wireless protocols.

The host translation layer 404 may be similar to the host translation layer 306 described in FIG. 3. In general, the host translation layer 404 handles the message translation and passing between the connect software layer 406 and the device dependent layer 402.

The connect software layer 406 executes in a user space 408 or operating system 410 of an operating environment (e.g., on a user device 300). The connect software layer 406 provides a user interface to the user, interfaces with libraries that may be executable from user space 408 or operating system 410, and accesses driver software via the host translation layer 404. The host translation layer 404 may be implemented as a library, operating system service, daemon, or other component that an executable in the connect software layer 406 may access in a similar manner to how the executable accesses other various libraries or operating system services.

The executable application operating in the connect software layer 406 may respond to a user's action, such as a user pressing a hard button on a housing of a user device while pointing the user device at an IoT device that she wishes to connect to and control. After the button is pressed the client device may present the IoT device for further user interaction. The user is then able to interact with the application with a touch and launch device specific software. As an example, if the user were to point the client user device at a refrigerator, the client user device and the refrigerator may pair, and refrigerator software may be launched and show the temperature, if the door is closed, what food and how much of it is available, and other features of the refrigerator.

In such an example, the connect software layer 406 receives user input initiating a connection attempt, the connect software layer 406 handles the user input and passes relevant information to the host translation layer 404. The host translation layer 404 is used to attempt to connect to the IoT device being pointed at by the user. The host translation layer 404 may query the IoT device to determine available protocols that may be used to connect the user device and the IoT device. The host translation layer 404 may then control which aspects of the device dependent layer 402 are implemented to connect to the IoT device.

For instance, if the client device includes the abilities to connect using BLUETOOTH and ZIGBEE, the host translation layer 404 may attempt to discern what type of connection methods are available from a target IoT device and then use the appropriate components from the device dependent layer 402 to connect to the target IoT device.

The host translation layer 404 translates messages from the connect software layer 406 to the device dependent layer 402. The host translation layer 404 is also responsible for book keeping the various connection parameters and maintaining local databases to supply them. Part of the database contents may be populated by the device vender. The host translation layer 404 includes device-dependent components that interface with the underlying hardware. These components may be installed by the connect software layer 406 or may be preinstalled by the device vender. The detail of the range limitation and connection parameters may be handled by the host translation layer 404.

The device dependent layer 402 is the domain of the vender and is similar to the current connection mechanisms. The device dependent layer 402 includes protocol-specific communication hardware and driver software. Because there are multiple communication mechanisms the device dependent layer 402 may include many parts (e.g., for Bluetooth, Wi-Fi direct, etc.).

Figure 5:
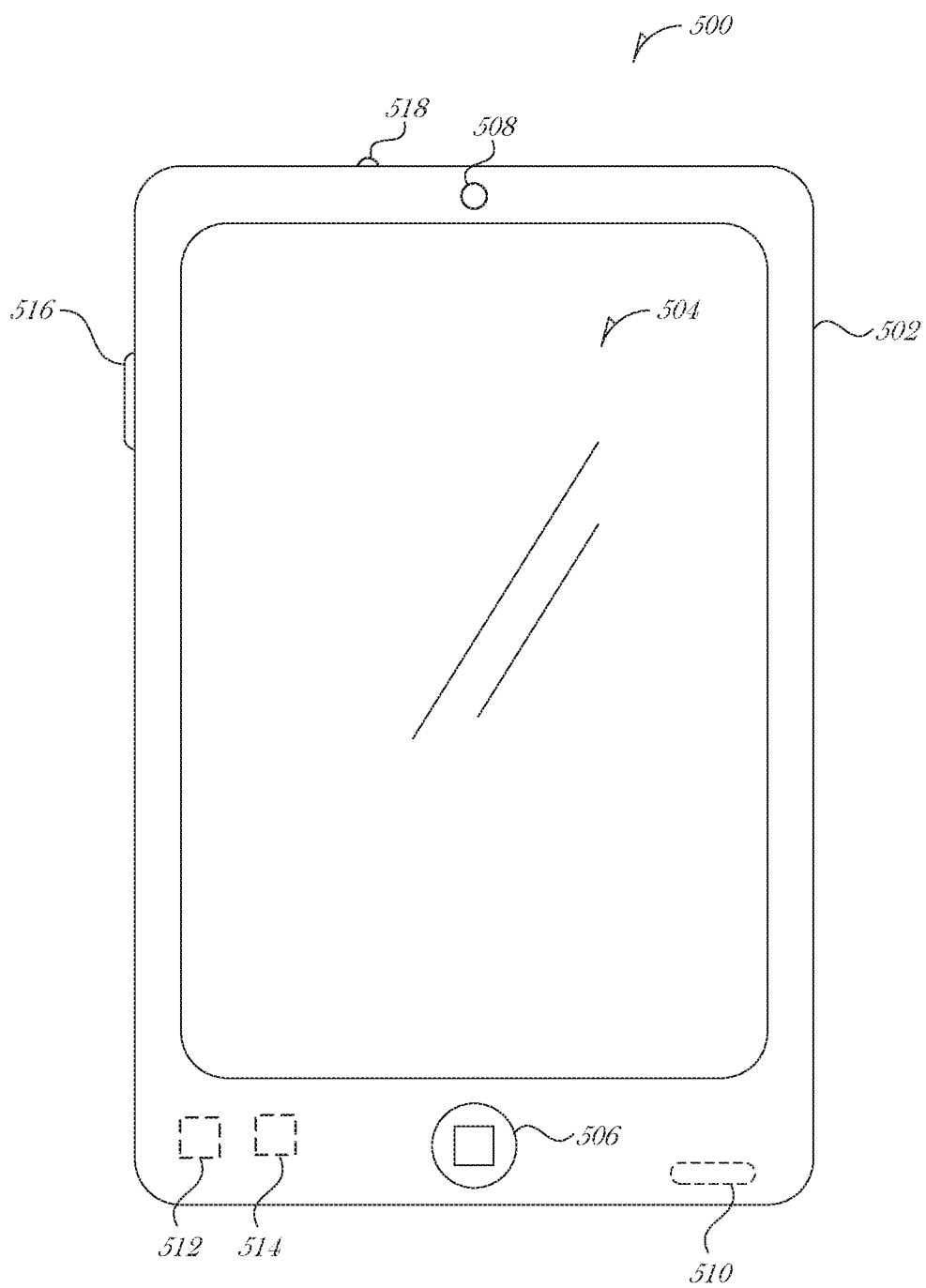
FIG. 5 is a block diagram illustrating a user device, according to an embodiment.

FIG. 5 is a block diagram illustrating a user device 500, according to an embodiment. The user device 500 is illustrated as a smartphone in this example, through it will be understood that user device 500 is representative of other types of computing devices, which may have more or fewer components, devices, or other features than exemplary user device 500. User device 500 has a housing 502 that encloses the interior components. The housing 502 may provide access to the interior of device 500 to some degree. For instance, in devices with a user-replaceable battery, flash memory card, or subscriber identity module (SIM) card, the housing 502 may include a user-removable cover. In devices having a design that does not facilitate user access to the interior, housing 502 may nonetheless have a provision for permitting access to technicians so that certain components may be repaired or replaced if needed.

User device 500 further includes a touchscreen 504, which may form a part of the overall enclosure of device 500 in cooperation with housing 502. The touchscreen 504 includes hardware that functions as an output device (e.g., an LED screen for visual display, power and controller circuitry, etc.), and an input device generally layered over the visual display and formed from a suitable touch or proximity-sensitive technology (e.g., capacitive, resistive, optical, ultrasonic, etc.), along with the corresponding detection and power circuitry. Additionally, the user device 500 includes a user input device 506, which in this example represents one or more user-operable input devices, such as button(s), keypad, keyboard, trackpad, mouse, etc.

As further depicted in FIG. 5, the user device 500 has several data capture devices, such as sensing transducers, the physical stimulation of which produces signaling that may be sampled, digitized, and stored as captured data. The camera 508 includes an image sensor, along with additional hardware for digitizing, processing, and storing portions of the image sensor output. The camera 508 also includes optics that may form a portion of the housing 502. The camera 508 may record still images, motion video, or both.

A microphone 510 includes audio capture circuitry that samples, digitizes, and stores portions of the signaling produced by the microphone 510 in response to sensed acoustic stimulus. The microphone 510 is typically activated together with the camera 508 when the user device 500 is operated to record videos.

Additional sensors in the user device 500 include an accelerometer 512 with a multi-axis sensor that produces signaling in response to changes in motion, and electronics to sample and digitize that signaling, and a magnetometer 514 with sensors and supporting circuitry that detect the direction and intensity of the ambient magnetic field, or any externally-applied magnetic fields.

The user device 500 may also include a user input control (e.g., hard button, a slider, a switch, or a soft button) to trigger the emitter and Bluetooth connection sequence. For example, the user device 500 may have a user input control 516 on the side of the housing 502, in this example a button, which when actuated by the user, causes a signal to be emitted from a transmitter 518. As discussed above, the signal emitted from the transmitter 518 may be of various types of directional signals, including but not limited to IR or millimeter wave. The user action may initiate the process flow discussed above with respect to FIGS. 1-3 and elsewhere herein.

Figure 6:
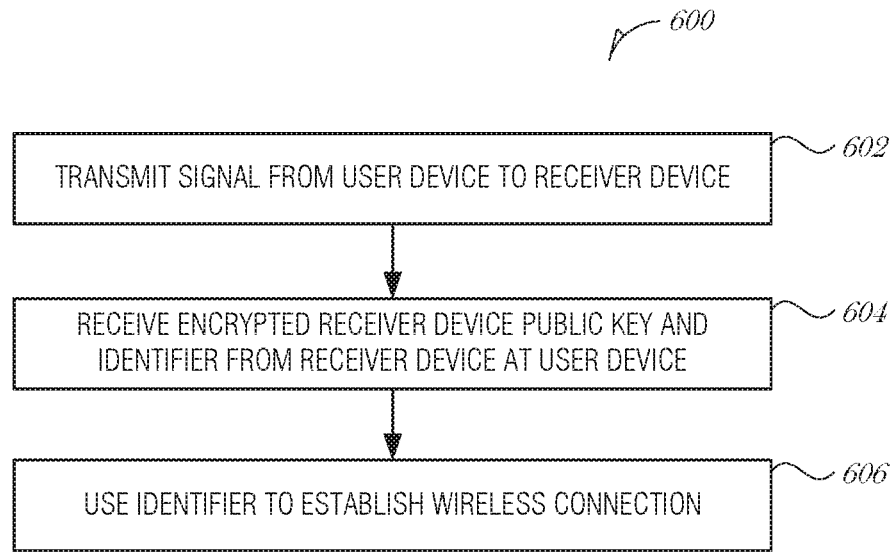
FIG. 6 is a flowchart illustrating a method for initiating a communication session from a user device, according to an embodiment.

FIG. 6 is a flowchart illustrating a method 600 for initiating a communication session from a user device, according to an embodiment. At block 602, a first signal is transmitted to a receiver device using a directional transmitter disposed in a housing of the user device, the first signal including a public key associated with the user device. In an embodiment, the directional transmitter is an infrared transmitter, and wherein the first signal is an infrared signal. In a related embodiment, the directional transmitter is a directional millimeter wave transmitter, and the first signal is a millimeter wave signal. In another embodiment, the directional transmitter is a directional sound wave transmitter, and the first signal is a directional sound wave signal.

At block 604, a response from the receiver device is received via a non-directional radio disposed in the housing of the user device, the response including an encrypted public key of the receiver device and a unique identifier that identifies the receiver device, the public key of the receiver device and the unique identifier both encrypted with the public key associated with the system.

In an embodiment, the non-directional radio comprises a Bluetooth radio to interface with a Bluetooth host and firmware, and to establish the Bluetooth connection with the receiver device. In a related embodiment, the unique identifier is a Bluetooth device identifier of the receiver device.

At block 606, the response is used to establish a wireless connection between the system and the receiver device.

In an embodiment, the method 600 includes receiving input from a user input control and triggering the communication controller to transmit the first signal in response to the input. In an embodiment, the user input control comprises a hard button on an exterior portion of the housing. In a related embodiment, the user input control comprises a slider on an exterior portion of the housing. In another embodiment, the user input control comprises a switch on an exterior portion of the housing.

In an embodiment, the method 600 includes determining a wireless protocol available from the receiving device and configuring the non-directional radio to communicate using the wireless protocol. In a further embodiment, the non-directional radio is configurable to communicate using a plurality of wireless protocols including BLUETOOTH and ZIGBEE.

Figure 7:
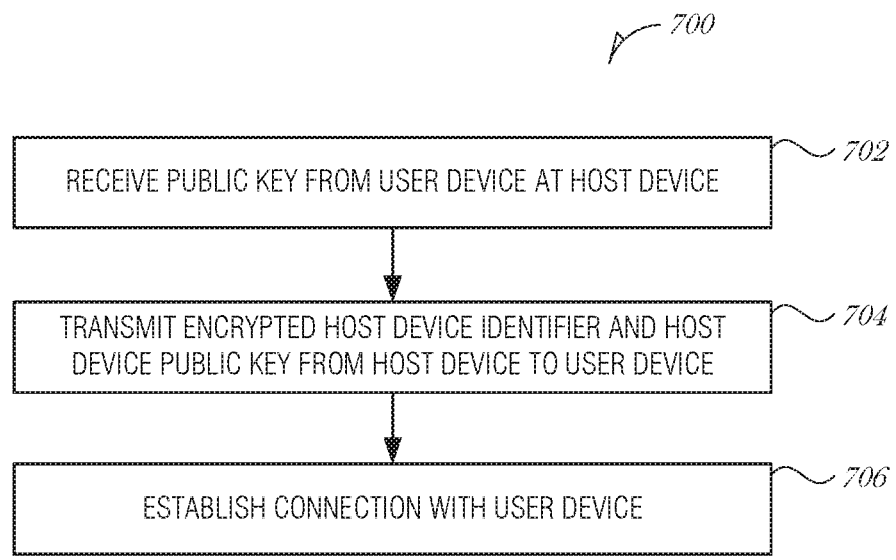
FIG. 7 is a flowchart illustrating a method for establishing a communication session with a user device, according to an embodiment.

FIG. 7 is a flowchart illustrating a method 700 for establishing a communication session with a user device, according to an embodiment. At block 702, a first signal from the user device is received via a transceiver of a host device, the first signal including a public key associated with the user device. In an embodiment, the receiver is an infrared receiver, and wherein the first signal is an infrared signal. In an embodiment, the receiver is a directional millimeter wave receiver, and the first signal is a millimeter wave signal. In another embodiment, the receiver is a directional sound wave receiver, and the first signal is a directional sound wave signal.

At block 704, a public key of the host device and a unique identifier of the host device is transmitted via a radio, to the user device, the public key of the host device and the unique identifier of the host device each encrypted with the public key received from the user device.

At block 706, a wireless connection is established between the host device and the user device.

In an embodiment, the unique identifier is a BLUETOOTH device identifier of the system. In a related embodiment, establishing the wireless connection comprises interfacing with a BLUETOOTH host on the system in order to respond to a connection request from the remote device.

In another embodiment, establishing the wireless connection comprises interfacing with a ZIGBEE host on the system in order to respond to a connection request from the remote device.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 8:
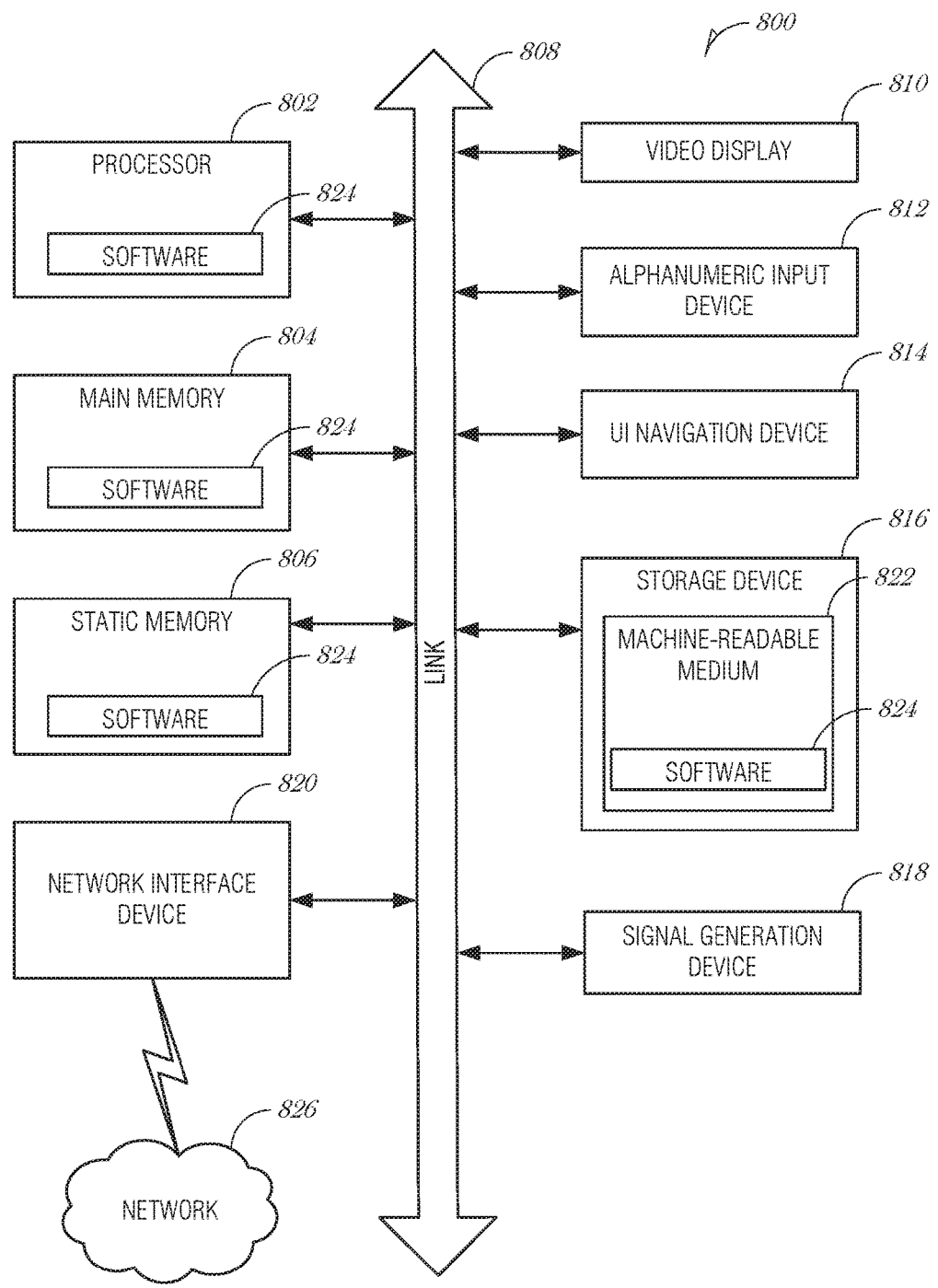
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be. executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., BLUETOOTH, WI-FI, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for initiating a communication session, the system comprising: a transmitter disposed in a housing of the system; a controller coupled to the transmitter, and disposed in the housing; a communication controller to interface with the controller and cause the transmitter to transmit a first signal to a receiver device, the first signal including a public key associated with the system; and a radio coupled to the communication controller to receive a response from the receiver device, the response including an encrypted public key of the receiver device and a unique identifier that identifies the receiver device, the public key of the receiver device and the unique identifier both encrypted with the public key associated with the system, and the response used to establish a wireless connection between the system and the receiver device.

In Example 2, the subject matter of Example 1 optionally includes wherein the transmitter is an infrared transmitter, and wherein the first signal is an infrared signal.

In Example 3, the subject matter of any one or more of Examples 1-2 optionally include wherein the transmitter is a directional millimeter wave transmitter, and wherein the first signal is a millimeter wave signal.

In Example 4, the subject matter of any one or more of Examples 1-3 optionally include wherein the transmitter is a directional sound wave transmitter, and wherein the first signal is a directional sound wave signal.

In Example 5, the subject matter of any one or more of Examples 1-4 optionally include wherein the radio comprises a BLUETOOTH, radio to: interface with a BLUETOOTH host and firmware; and establish the BLUETOOTH connection with the receiver device.

In Example 6, the subject matter of any one or more of Examples 1-5 optionally include wherein the unique identifier is a BLUETOOTH device identifier of the receiver device.

In Example 7, the subject matter of any one or more of Examples 1-6 optionally include a user input control that is communicatively coupled to the communication controller when in operation, and is configured to receive a user input and trigger the communication controller to transmit the first signal.

In Example 8, the subject matter of Example 7 optionally includes wherein the user input control comprises a hard button on an exterior portion of the housing.

In Example 9, the subject matter of any one or more of Examples 7-8 optionally include wherein the user input control comprises a slider on an exterior portion of the housing.

In Example 10, the subject matter of any one or more of Examples 7-9 optionally include wherein the user input control comprises a switch on an exterior portion of the housing.

In Example 11, the subject matter of any one or more of Examples 1-10 optionally include wherein the system is a user device.

In Example 12, the subject matter of any one or more of Examples 1-11 optionally include wherein the communication controller is to: determine a wireless protocol available from the receiving device; and configure the radio to communicate using the wireless protocol.

In Example 13, the subject matter of Example 12 optionally includes wherein the radio is configurable to communicate using a plurality of wireless protocols including BLUETOOTH and ZIGBEE.

Example 14 is a method for initiating a communication session from a user device, the method comprising: transmitting a first signal to a receiver device using a directional transmitter disposed in a housing of the user device, the first signal including a public key associated with the user device; receiving, via a non-directional radio disposed in the housing of the user device, a response from the receiver device, the response including an encrypted public key of the receiver device and a unique identifier that identifies the receiver device, the public key of the receiver device and the unique identifier both encrypted with the public key associated with the system; and using the response to establish a wireless connection between the system and the receiver device.

In Example 15, the subject matter of Example 14 optionally includes wherein the directional transmitter is an infrared transmitter, and wherein the first signal is an infrared signal.

In Example 16, the subject matter of any one or more of Examples 14-15 optionally include wherein the directional transmitter is a directional millimeter wave transmitter, and wherein the first signal is a millimeter wave signal.

In Example 17, the subject matter of any one or more of Examples 14-16 optionally include wherein the directional transmitter is a directional sound wave transmitter, and wherein the first signal is a directional sound wave signal.

In Example 18, the subject matter of any one or more of Examples 14-17 optionally include wherein the non-directional radio comprises a BLUETOOTH radio to interface with a BLUETOOTH host and firmware, and to establish the BLUETOOTH connection with the receiver device.

In Example 19, the subject matter of any one or more of Examples 14-18 optionally include wherein the unique identifier is a BLUETOOTH device identifier of the receiver device.

In Example 20, the subject matter of any one or more of Examples 14-19 optionally include receiving input from a user input control; and triggering the communication controller to transmit the first signal in response to the input.

In Example 21, the subject matter of Example 20 optionally includes wherein the user input control comprises a hard button on an exterior portion of the housing.

In Example 22, the subject matter of any one or more of Examples 20-21 optionally include wherein the user input control comprises a slider on an exterior portion of the housing.

In Example 23, the subject matter of any one or more of Examples 20-22 include wherein the user input control comprises a switch on an exterior portion of the housing.

In Example 24, the subject matter of any one or more of Examples 14-23 optionally include determining a wireless protocol available from the receiving device; and configuring the non-directional radio to communicate using the wireless protocol.

In Example 25, the subject matter of Example 24 optionally includes wherein the non-directional radio is configurable to communicate using a plurality of wireless protocols including BLUETOOTH and ZIGBEE.

Example 26 is at least one machine-readable medium including instructions, which when executed by a machine, cause the machine to perform operations of any of the methods of Examples 14-25.

Example 27 is an apparatus comprising means for performing any of the methods of Examples 14-25.

Example 28 is an apparatus for initiating a communication session from a user device, the apparatus comprising: means for transmitting a first signal to a receiver device using a directional transmitter disposed in a housing of the user device, the first signal including a public key associated with the user device; means for receiving, via a non-directional radio disposed in the housing of the user device, a response from the receiver device, the response including an encrypted public key of the receiver device and a unique identifier that identifies the receiver device, the public key of the receiver device and the unique identifier both encrypted with the public key associated with the system; and means for using the response to establish a wireless connection between the system and the receiver device.

In Example 29, the subject matter of Example 28 optionally includes wherein the directional transmitter is an infrared transmitter, and wherein the first signal is an infrared signal.

In Example 30, the subject matter of any one or more of Examples 28-29 optionally include wherein the directional transmitter is a directional millimeter wave transmitter, and wherein the first signal is a millimeter wave signal.

In Example 31, the subject matter of any one or more of Examples 28-30 optionally include wherein the directional transmitter is a directional sound wave transmitter, and wherein the first signal is a directional sound wave signal.

In Example 32, the subject matter of any one or more of Examples 28-31 optionally include wherein the non-directional radio comprises a Bluetooth radio to interface with a BLUETOOTH host and firmware, and to establish the BLUETOOTH connection with the receiver device.

In Example 33, the subject matter of any one or more of Examples 28-32 optionally include wherein the unique identifier is a BLUETOOTH device identifier of the receiver device.

In Example 34, the subject matter of any one or more of Examples 28-33 optionally include means for receiving input from a user input control; and means for triggering the communication controller to transmit the first signal in response to the input.

In Example 35, the subject matter of Example 34 optionally includes wherein the user input control comprises a hard button on an exterior portion of the housing.

In Example 36, the subject matter of any one or more of Examples 34-35 optionally include wherein the user input control comprises a slider on an exterior portion of the housing.

In Example 37, the subject matter of any one or more of Examples 34-36 optionally include wherein the user input control comprises a switch on an exterior portion of the housing.

In Example 38, the subject matter of any one or more of Examples 28-37 optionally include means for determining a wireless protocol available from the receiving device; and means for configuring the non-directional radio to communicate using the wireless protocol.

In Example 39, the subject matter of Example 38 optionally includes wherein the non-directional radio is configurable to communicate using a plurality of wireless protocols including BLUETOOTH and ZIGBEE.

Example 40 is at least one machine-readable medium including instructions for initiating a communication session, which when executed by a machine, cause the machine to: transmit, using a transmitter, a first signal to a receiver device, the first signal including a public key associated with the machine; and receive, via a radio, a response from the receiver device, the response including an encrypted public key of the receiver device and a unique identifier that identifies the receiver device, the public key of the receiver device and the unique identifier both encrypted with the public key associated with the system, and the response used to establish a wireless connection between the system and the receiver device.

In Example 41, the subject matter of Example 40 optionally includes wherein the transmitter is an infrared transmitter, and wherein the first signal is an infrared signal.

In Example 42, the subject matter of any one or more of Examples 40-41 optionally include wherein the transmitter is a directional millimeter wave transmitter, and wherein the first signal is a millimeter wave signal.

In Example 43, the subject matter of any one or more of Examples 40-42 optionally include wherein the transmitter is a directional sound wave transmitter, and wherein the first signal is a directional sound wave signal.

In Example 44, the subject matter of any one or more of Examples 40-43 optionally include wherein the radio comprises a BLUETOOTH radio to: interface with a BLUETOOTH host and firmware; and establish the BLUETOOTH connection with the receiver device.

In Example 45, the subject matter of any one or more of Examples 40-44 optionally include wherein the unique identifier is a BLUETOOTH device identifier of the receiver device.

In Example 46, the subject matter of any one or more of Examples 40-45 optionally include wherein the machine is a user device.

In Example 47, the subject matter of any one or more of Examples 40-46 optionally include instructions to: determine a wireless protocol available from the receiving device; and configure the radio to communicate using the wireless protocol.

In Example 48, the subject matter of Example 47 optionally includes wherein the radio is configurable to communicate using a plurality of wireless protocols including BLUETOOTH and ZIGBEE.

Example 49 is a system for establishing a communication session, the system comprising: a receiver disposed in a housing of the system; a controller coupled to the receiver, and disposed in the housing; and a communication controller to interface with the controller and to: receive, via the receiver, a first signal from a remote device, the first signal including a public key associated with the remote device; transmit, via a radio, a public key of the system and a unique identifier of the system, to the remote device, the public key of the system and the unique identifier of the system each encrypted with the public key received from the remote device; and establish a wireless connection between the system and the remote device.

In Example 50, the subject matter of Example 49 optionally includes wherein the receiver is an infrared receiver, and wherein the first signal is an infrared signal.

In Example 51, the subject matter of any one or more of Examples 49-50 optionally include wherein the receiver is a directional millimeter wave receiver, and wherein the first signal is a millimeter wave signal.

In Example 52, the subject matter of any one or more of Examples 49-51 optionally include wherein the receiver is a directional sound wave receiver, and wherein the first signal is a directional sound wave signal.

In Example 53, the subject matter of any one or more of Examples 49-52 optionally include wherein the unique identifier is a BLUETOOTH device identifier of the system.

In Example 54, the subject matter of any one or more of Examples 49-53 optionally include wherein to establish the wireless connection, the communication controller is to interface with a BLUETOOTH host on the system in order to respond to a connection request from the remote device.

In Example 55, the subject matter of any one or more of Examples 49-54 optionally include wherein to establish the wireless connection, the communication controller is to interface with a ZIGBEE host on the system in order to respond to a connection request from the remote device.

Example 56 is a method for establishing a communication session with a user device, the method comprising: receiving, via a transceiver of a host device, a first signal from the user device, the first signal including a public key associated with the user device; transmitting, via a radio, a public key of the host device and a unique identifier of the host device, to the user device, the public key of the host device and the unique identifier of the host device each encrypted with the public key received from the user device; and establishing a wireless connection between the host device and the user device.

In Example 57, the subject matter of Example 56 optionally includes wherein the receiver is an infrared receiver, and wherein the first signal is an infrared signal.

In Example 58, the subject matter of any one or more of Examples 56-57 optionally include wherein the receiver is a directional millimeter wave receiver, and wherein the first signal is a millimeter wave signal.

In Example 59, the subject matter of any one or more of Examples 56-58 optionally include wherein the receiver is a directional sound wave receiver, and wherein the first signal is a directional sound wave signal.

In Example 60, the subject matter of any one or more of Examples 56-59 optionally include wherein the unique identifier is a BLUETOOTH device identifier of the system.

In Example 61, the subject matter of any one or more of Examples 56-60 optionally include wherein establishing the wireless connection comprises interfacing with a BLUETOOTH host on the system in order to respond to a connection request from the remote device.

In Example 62, the subject matter of any one or more of Examples 56-61 optionally include wherein establishing the wireless connection comprises interfacing with a ZIGBEE host on the system in order to respond to a connection request from the remote device.

Example 63 is at least one machine-readable medium including instructions, which when executed by a machine, cause the machine to perform operations of any of the methods of Examples 56-62.

Example 64 is an apparatus comprising means for performing any of the methods of Examples 56-62.

Example 65 is an apparatus for establishing a communication session with a user device, the apparatus comprising: means for receiving, via a transceiver of a host device, a first signal from the user device, the first signal including a public key associated with the user device; means for transmitting, via a radio, a public key of the host device and a unique identifier of the host device, to the user device, the public key of the host device and the unique identifier of the host device each encrypted with the public key received from the user device; and means for establishing a wireless connection between the host device and the user device.

In Example 66, the subject matter of Example 65 optionally includes wherein the receiver is an infrared receiver, and wherein the first signal is an infrared signal.

In Example 67, the subject matter of any one or more of Examples 65-66 optionally include wherein the receiver is a directional millimeter wave receiver, and wherein the first signal is a millimeter wave signal.

In Example 68, the subject matter of any one or more of Examples 65-67 optionally include wherein the receiver is a directional sound wave receiver, and wherein the first signal is a directional sound wave signal.

In Example 69, the subject matter of any one or more of Examples 65-68 optionally include wherein the unique identifier is a BLUETOOTH device identifier of the system.

In Example 70, the subject matter of any one or more of Examples 65-69 optionally include wherein the means for establishing the wireless connection comprise means for interfacing with a BLUETOOTH host on the system in order to respond to a connection request from the remote device.

In Example 71 the subject matter of any one or more of Examples 65-70 optionally include wherein the means for establishing the wireless connection comprise means for interfacing with a ZIGBEE host on the system in order to respond to a connection request from the remote device.

Example 72 is at least one machine-readable medium including instructions for establishing a communication session with a user device, which when executed by a machine, cause the machine to: receive, via a transceiver of a host device, a first signal from the user device, the first signal including a public key associated with the user device; transmit, via a radio, a public key of the host device and a unique identifier of the host device, to the user device, the public key of the host device and the unique identifier of the host device each encrypted with the public key received from the user device; and establish a wireless connection between the host device and the user device.

In Example 73, the subject matter of Example 72 optionally includes wherein the receiver is an infrared receiver, and wherein the first signal is an infrared signal.

In Example 74, the subject matter of any one or more of Examples 72-73 optionally include wherein the receiver is a directional millimeter wave receiver, and wherein the first signal is a millimeter wave signal.

In Example 75, the subject matter of any one or more of Examples 72-74 optionally include wherein the receiver is a directional sound wave receiver, and wherein the first signal is a directional sound wave signal.

In Example 76, the subject matter of any one or more of Examples 72-75 optionally include wherein the unique identifier is a BLUETOOTH device identifier of the system.

In Example 77, the subject matter of any one or more of Examples 72-76 optionally include wherein the instructions to establish the wireless connection comprise instructions to interface with a BLUETOOTH host on the system in order to respond to a connection request from the remote device.

In Example 78, the subject matter of any one or more of Examples 72-77 optionally include wherein the instructions to establish the wireless connection comprise instructions to interface with a ZIGBEE host on the system in order to respond to a connection request from the remote device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the. disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for initiating a communication session, the system comprising:
   a transmitter disposed in a housing of the system;
   a controller coupled to the transmitter, and disposed in the housing;
   a communication controller to interface with the controller and cause the transmitter to transmit a first signal to a receiver device, the first signal including a public key associated with the system; and
   a radio coupled to the communication controller to receive a response from the receiver device, the response including an encrypted public key of the receiver device and a unique identifier that identifies the receiver device, the public key of the receiver device and the unique identifier both encrypted with the public key associated with the system, and the response used to establish a wireless connection between the system and the receiver device, wherein the unique identifier is a BLUETOOTH device identifier of the receiver device.

2. The system of claim 1, wherein the transmitter is an infrared transmitter, and wherein the first signal is an infrared signal.

3. The system of claim 1, wherein the transmitter is a directional millimeter wave transmitter, and wherein the first signal is a millimeter wave signal.

4. The system of claim 1, wherein the transmitter is a directional sound wave transmitter, and wherein the first signal is a directional sound wave signal.

5. The system of claim 1, wherein the radio comprises a BLUETOOTH radio to:
   interface with a BLUETOOTH host and firmware; and
   establish a BLUETOOTH connection with the receiver device.

6. The system of claim 1, further comprising a user input control that is communicatively coupled to the communication controller when in operation, and is configured to receive a user input and trigger the communication controller to transmit the first signal.

7. The system of claim 6, wherein the user control comprises a hard button on an exterior portion of the housing.

8. The system of claim 6, wherein the user input control comprises a slider on an exterior portion of the housing.

9. The system of claim 6, wherein the user input control comprises a switch on an exterior portion of the housing.

10. The system of claim 1, wherein the system is a user device.

11. The system of claim 1, wherein the communication controller is to:
    determine a wireless protocol available from the receiving device; and
    configure the radio to communicate using the wireless protocol.

12. The system of claim 11, wherein the radio is configurable to communicate using a plurality of wireless protocols including BLUETOOTH and ZIGBEE.

13. A method for initiating a communication session from a user device, the method comprising:
    transmitting a first signal to a receiver device using a directional transmitter disposed in a housing of the user device, the first signal including a public key associated with the user device;
    receiving, via a non-directional radio disposed in the housing of the user device, a response from the receiver device, the response including an encrypted public key of the receiver device and a unique identifier that identifies the receiver device, the public key of the receiver device and the unique identifier both encrypted with the public key associated with the system, wherein the unique identifier is a BLUETOOTH device identifier of the receiver device; and
    using the response to establish a wireless connection between the system and the receiver device.

14. The method of claim 13, wherein the directional transmitter is an infrared transmitter, and wherein the first signal is an infrared signal.

15. The method of claim 13, wherein the directional transmitter is a directional millimeter wave transmitter, and wherein the first signal is a millimeter wave signal.

16. At least one non-transitory machine-readable medium including instructions for initiating a communication session, which when executed by a machine, cause the machine to:
    transmit, using a transmitter, a first signal to a receiver device, the first signal including a public key associated with the machine; and
    receive, via a radio, a response from the receiver device, the response including an encrypted public key of the receiver device and a unique identifier that identifies the receiver device, the public key of the receiver device and the unique identifier both encrypted with the public key associated with the system, and the response used to establish a wireless connection between the system and the receiver device, wherein the unique identifier is a BLUETOOTH device identifier of the receiver device.

17. The non-transitory machine-readable medium of claim 16, further comprising instructions to:
    determine a wireless protocol available from the receiving device; and
    configure the radio to communicate using the wireless protocol.

18. A system for establishing a communication session, the system comprising:
    a receiver disposed in a housing of the system;
    a controller coupled to the receiver, and disposed in the housing; and
    a communication controller to interface with the controller and to:
    receive, via the receiver, a first signal from a remote device, the first signal including a public key associated with the remote device;
    transmit, via a radio, a public key of the system and a unique identifier of the system, to the remote device, the public key of the system and the unique identifier of the system each encrypted with the public key received from the remote device, wherein the unique identifier is a BLUETOOTH device identifier of the receiver device; and establish a wireless connection between the system and the remote device.

19. The system of claim 18, wherein the receiver is an infrared receiver, and wherein the first signal is an infrared signal.

20. The system of claim 18, wherein the receiver is a directional millimeter wave receiver, and wherein the first signal is a millimeter wave signal.

21. A method for establishing a communication session with a user device, the method comprising:

receiving, via a transceiver of a host device, a first signal from the user device, the first signal including a public key associated with the user device;

transmitting, via a radio, a public key of the host device and a unique identifier of the host device, to the user device, the public key of the host device and the unique identifier of the host device each encrypted with the public key received from the user device, wherein the unique identifier is a BLUETOOTH device identifier of the receiver device; and establishing a wireless connection between the host device and the user device.

22. The method of claim 21, wherein the receiver is an infrared receiver, and wherein the first signal is an infrared signal.

23. The method of claim 21, wherein the receiver is a directional millimeter wave receiver, and wherein the first signal is a millimeter wave signal.

24. The method of claim 21, wherein the receiver is a directional sound wave receiver, and wherein the first signal is a directional sound wave signal.

* * * * *

UNITED STATES PATENT AND TRADEMARK OFFICE
CERTIFICATE OF CORRECTION

PATENT NO. : 10,505,909 B2
APPLICATION NO. : 15/387111
DATED : December 10, 2019
INVENTOR(S) : Indrajith Rajapaksa Page 1 of 1

It is certified that error appears in the above-identified patent and that said Letters Patent is hereby corrected as shown below:

In the Claims

In Column 19, Line 57, in Claim 7, after "user", insert --input--

Signed and Sealed this
Eighteenth Day of August, 2020

Andrei Iancu
*Director of the United States Patent and Trademark Office*